UNITED STATES PATENT OFFICE.

RUFUS C. BEARDEN, OF KNOXVILLE, TENNESSEE, ASSIGNOR TO THE BEARDEN BUTTER COMPANY, OF SAME PLACE.

ART OF MAKING BUTTER.

SPECIFICATION forming part of Letters Patent No. 592,215, dated October 19, 1897.

Application filed November 17, 1893. Serial No. 491,246. (No specimens.)

*To all whom it may concern:*

Be it known that I, RUFUS C. BEARDEN, a citizen of the United States, residing at Knoxville, in the county of Knox and State of Tennessee, have invented certain new and useful Improvements in the Art of Making Butter; and I do hereby declare the following to be a full, clear, and exact description of the invention, such as will enable others skilled in the art to which it appertains to make and use the same.

My invention relates to the art of butter-making.

The objects and nature of the invention will more fully appear from the subjoined description and the novelty will be pointed out in the claim.

Heretofore in converting cream into butter it has been the custom to exclude, as far as possible, from the compound all the elements of the cream except the fatty particles, so as to make as near as possible an oleaginous mass. In doing this the cream is deprived of the phosphatic and other salts and the casein and other elements. As is well known, cream is one of the perfect foods—*i e*, it contains all the elements necessary to support life. When changed to butter, the oleaginous part is the sole element. This element when taken as food has only heat-producing qualities. The phosphatic and other elements that supply the tissue wants of the human body are, in the form of buttermilk, usually thrown away or wasted, so far as man is concerned.

The object of my invention is to combine with the oleaginous portion all of those elements, heretofore discarded, in such proportions that the resultant thereof will be a compound that has all the useful characteristics of butter, and at the same time be a food that will sustain life.

To that end the invention consists in a new and improved process of making butter, as will be hereinafter described.

In carrying out my process, I prefer to use an open vessel or a churn with the cover removed, so that air can have free access to the contents of the churn. In this vessel I place a certain amount of butter and add thereto an equal quantity of cream of the same weight or measure as the butter, which may, however, be placed in the vessel with or after the cream has been placed therein. The mixture is then churned or agitated until they are thoroughly commingled together, when it will be found that the entire contents of the vessel has become a solid mass. This mass is removed from the vessel and worked in the ordinary way.

In practice I find that the best, quickest, and most satisfactory results are obtained by taking equal quantities of sweet cream and sour cream, that which has stood for some hours and become sour or coagulated, and for every pint or pound of each adding one pound of good butter and thoroughly mixing and commingling all together in some vessel that admits of the free circulation of air. The cream and butter should be at a temperature equal to 70° Fahrenheit when placed in the vessel.

While not confining myself strictly to the above process, I find that a substantial following of the same yields the best results. Butter can be made by my process from either sweet or sour cream alone, but at the expense of greater time and labor. Of course by varying the proportions of cream and butter the composition produced will vary. If less butter be used, the proportions of phosphatic and other salts and the casein and other elements will be increased. On the other hand, any increase in the amount of butter put in the churn will decrease the proportions of the phosphatic and other elements. The proportions above stated are therefore preferred as producing the best results.

Heretofore it has been proposed to produce from a given quantity of milk an enlarged yield of butter by allowing milk to stand in a warm room until soured or clabbered, and then adding a certain amount of butter, and churning the entire mass, by which process it is said to be possible to obtain about ten pounds of butter from each one hundred pounds of milk.

My process is distinguished from the foregoing in that, instead of employing soured milk, I employ cream, and also in the proportions employed, which are important in obtaining the best results of my invention.

My process yields from twenty-one to twenty-two pounds of butter to one hundred pounds of milk and the product is, in consistency, color, flavor, and wholesomeness, fully up to the highest standards.

What I claim as new is—

The herein-described process of making butter, consisting in adding to cream one pound of butter to each pint of cream, churning the mixture in an open vessel at a temperature of about 70° Fahrenheit until combined in a solid mass, and then working the mass in the usual way, substantially as set forth.

In testimony whereof I affix my signature in presence of two witnesses.

RUFUS C. BEARDEN.

Witnesses:
W. L. WELCKER,
JOHN BRENT.